(12) United States Patent
Stroh (10) Patent No.: US 8,047,420 B2
(45) Date of Patent: Nov. 1, 2011

(54) METHOD FOR PRODUCING A WELDED JOINT BETWEEN ELECTRICAL CONDUCTORS BY MEANS OF AN ULTRASONIC WELDING METHOD

(75) Inventor: Dieter Stroh, Wettenberg (DE)

(73) Assignee: Ultraschalltechnik GmbH, Wettenberg (DE)

( * ) Notice: Subject to any disclaimer, the term of this patent is extended or adjusted under 35 U.S.C. 154(b) by 246 days.

(21) Appl. No.: 12/088,016

(22) PCT Filed: Oct. 7, 2006

(86) PCT No.: PCT/EP2006/009715
§ 371 (c)(1),
(2), (4) Date: Jun. 12, 2008

(87) PCT Pub. No.: WO2007/042235
PCT Pub. Date: Apr. 19, 2007

(65) Prior Publication Data
US 2008/0265004 A1    Oct. 30, 2008

(30) Foreign Application Priority Data
Oct. 10, 2005   (DE) .......................... 10 2005 048 368

(51) Int. Cl.
*B23K 20/10* (2006.01)
(52) U.S. Cl. .................. 228/110.1; 228/111; 228/1.1
(58) Field of Classification Search ............... 228/110.1, 228/111, 1.1
See application file for complete search history.

(56) References Cited

U.S. PATENT DOCUMENTS

| | | | |
|---|---|---|---|
| 4,596,352 A | 6/1986 | Knapp | |
| 5,941,443 A | 8/1999 | Steiner et al. | |
| 6,719,595 B1 * | 4/2004 | Welcker | 439/883 |
| 2002/0000459 A1 * | 1/2002 | Wnek et al. | 228/1.1 |
| 2006/0283912 A1 | 12/2006 | Eberach | |
| 2008/0032569 A1 * | 2/2008 | Steiner et al. | 439/874 |

FOREIGN PATENT DOCUMENTS

| | | | |
|---|---|---|---|
| DE | 3017364 A | * | 11/1981 |
| DE | 3338757 | | 5/1985 |
| DE | 3437749 | | 4/1986 |
| DE | 19906088 | | 2/2000 |
| DE | 102004044480 A1 | * | 2/2006 |
| JP | 2005085560 A | * | 3/2005 |

OTHER PUBLICATIONS

DE 3017364 A Computer English Translation.*
English computer translation JP 2005085560 A.*
English computer translation DE102004044480A1.*

(Continued)

*Primary Examiner* — Jessica L Ward
*Assistant Examiner* — Erin Saad
(74) *Attorney, Agent, or Firm* — Dennison, Schultz & MacDonald (57) ABSTRACT

A method for production of a welded connection between at least one first electrical conductor and at least one second electrical conductor, in which the conductors are brought into a compression chamber enclosed by delimitation elements and welded therein by an ultrasound welding device, one of the delimitation elements forming a sonotrode which may be subjected to ultrasound vibration. According to the invention, in order to connect a first conductor in the desired circumference with second conductors, where the total cross-section of the second conductors for connection to the first conductor can optionally be greater than the usual cross-section with the ultrasound device used, the first conductor is welded sequentially with two or more second conductors in the compression chamber.

17 Claims, 7 Drawing Sheets

OTHER PUBLICATIONS

De-A: Die Bibliothek der Technik, Band 108: Ultraschall-Metallschweissen, Verlag Moderne Industrie, (The Library of Technology, vol. 108: Ultrasonic Metal Welding, Moderne Industrie Publishing), 86895 Landsberg, 1995, p. 43.

Greitmann et al, "Present Status and Future Prospects of Special Welding Processes-Ultrasonic Welding" Welding and Butting, DVS German Welding Society, vol. 55, No. 5, 2003, pp. 268-274.

\* cited by examiner

METHOD FOR PRODUCING A WELDED JOINT BETWEEN ELECTRICAL CONDUCTORS BY MEANS OF AN ULTRASONIC WELDING METHOD

BACKGROUND OF THE INVENTION

The present invention relates to a method for producing at least one welded joint between at least a first electrical conductor such as a rigid flat support, and at least a second electrical conductor such as litz wires, where the conductors are inserted into a compression space surrounded by limiting elements that can be adjusted relative to one another, and in which they are welded by means of an ultrasound welding device sonotrode which produces ultrasonic vibrations and forms one of the limiting elements.

In order to ultrasonically weld litz wires on a support, according to DE-C-34 37 749 it is provided that the cheeks limiting a compression space laterally can be displaced along the support, whereas the clearance of the cheeks is adjusted to the width of a section of a star sonotrode that dips into the compression space. The support itself is supported on a counter electrode, also called an anvil.

DE-Z.: Die Bibliothek der Technik, Band 108: Ultraschall-Metallschweißen, Verlag Moderne Industrie, (The Library of Technology, vol. 108: Ultrasonic Metal Welding, Moderne Industrie Publishing), 86895 Landsberg, 1995, page 43, shows a weld between a U-shaped cable lug and electrical conductors. For this purpose, ultrasonic welding devices are used, in which the conductors to be welded are inserted into a compression space that is limited in a known manner by sections of a sonotrode and anvil as well as laterally displaceable cheeks.

From WO-A-95/10866 a method is known for compressing and subsequent ultrasonic welding of electrical conductors, in particular litz wires, in a compression space that can be adjusted to the height and width of the conductor, whereby the conductors to be welded are first compressed and then welded. The compression space can be adjusted to a specified height-width ratio independently of the cross section of the conductor to be welded.

Compression spaces of ultrasonic welding devices that are adjustable in height and width are likewise apparent from EP-B-0 143 936 or DE-A-37 19 083.

The power rating of each of the ultrasonic welding devices that are used is designed for the maximum cross section of the conductors to be welded. If usually control cables, for example, are to be connected to a connector, also called a terminal, the power rating of the ultrasonic welding device to be used is designed for the cross section of the control cables to be welded. If an earth cable is also to be connected, it is connected to the terminal in a conventional manner by means of screws or plugs. The disadvantage of the corresponding connection is that contact resistances may appear, which may disturb the signals of the control cables.

But even if the power of the ultrasonic welding device is sufficient to weld an earth cable or battery cable, for example, to a control cable on a connector, there are still disadvantages in that adequate process monitoring is not possible, because the permissible tolerances when welding conductors with large cross sections are frequently larger than the cross sections of the control cables, so that combination errors could consequently appear that cannot be detected in process monitoring.

SUMMARY OF THE INVENTION

The task of the present invention is to further develop a method of the type mentioned above, such that in the desired scope a first conductor can be connected to second conductors by means of ultrasonic welding, whereby the total cross section of the second electrical conductors to be connected to the first electrical conductor should be larger if necessary than the conductor that is usually welded with the ultrasonic welding device used. It should also be possible to connect a first conductor to second conductors of large and small cross sections in a reliable manner, so that in particular no undesired contact resistances occur.

According to the present invention, the task is essentially solved in that the first conductor is welded successively to two or more second conductors in the compression space.

According to the present invention, the option is made available of welding a first conductor to second conductors of a total cross section that is larger than the cross sections of conductors that can usually be welded in a single welding process with the ultrasonic welding device used. According to the teachings of the present invention, it is further ensured that second conductors of large and small cross sections may be welded to a first conductor in a reliable manner because the second conductors with large cross sections are not welded simultaneously to the conductors of small cross sections, so that adequate process monitoring is possible. By these measures it is possible to weld second conductors to the first conductor in the desired scope without having to change the ultrasonic welding device. Ultrasonic welding devices may be used in which the power rating is designed for the maximum cross section of the individual second conductor to be connected to the respective first conductor, whereby individual process monitoring can be carried out taking the respective cross section of the conductor into account.

The method is especially advantageous if a further second conductor should be connected in addition to existent connections between first and second conductors without having to resort to the conventional types of connections like screws or plugs. In this way a secure and well-conducting connection is ensured, such that undesired contact resistances that may lead to disturbances do not occur. Consequently, trouble free connections of control cables and earth cables and/or batteries to a connector are possible, as occurs in wiring, particularly in automobile technology.

It is preferably provided that during the successive welding processes the first conductor is displaced relative to the compression space. The first conductor is preferably displaced relative to the compression space. However, it is also possible to displace the ultrasonic welding device, i.e. the compression space, along the first conductor, in order to successively weld the second conductors to the first conductor.

If the compression space can be adjusted cross-sectionally to the required extent, it is possible to weld second conductors one on top of another onto the first conductor. In this respect, successive welding is also carried out by first welding a second conductor to the first conductor, and then welding a further second conductor onto the second conductor welded onto the first conductor, and so on. But also simultaneous welding of several second conductors to a first conductor is possible, whereby at least a further second conductor is welded to the first conductor in a separate welding process.

The second conductors are preferentially welded to the first conductor and/or group of second conductors in areas that are spaced apart from one another. In this process, the first conductor may consist of sections that are spaced apart from one another by steps, whereby the second conductors are welded onto the sections running in the longitudinal direction of the first conductor.

If the second conductors are preferentially welded onto the first conductor in the areas spaced apart from one another in its longitudinal direction, it is also possible that two second conductors may be welded onto said first conductor in parallel in an area that runs crosswise to the longitudinal axis of the first conductor.

Welding second conductors onto the first conductor on opposite sides of this first conductor is likewise possible.

As a first second conductor an earth cable or battery cable and as a second conductor a control cable may be welded to the first conductor.

Consequently, the power rating of the ultrasonic welding device can be designed such that the second conductors to be welded to the first conductor may not all be weldable in a single welding process.

By successively welding two second conductors to the first conductor there is the further advantage that each of the second conductors to be welded in a welding process is connected to the first conductor in a reliable manner; because for example, if earth and/or battery cables, which may have cross sections between 6 and 35 $mm^2$ or 16 to 70 $mm^2$, respectively, were welded at the same time to control cables that may have cross sections between 0.22 and 6 $mm^2$, the tolerances provided for the earth and battery cables would hide defective welding to the control cables, so that defective welds could occur that would not be detectable.

Furthermore, the present invention provides that if during or after welding of the last second conductor to the first conductor, a first conductor is used with supporting sections, such as crimp tags, that originate at said first conductor, upon ultrasonic excitation of the sonotrode the supporting sections are bent in the direction of the second conductors in order to secure them.

It is also possible to surround the weld area with heat shrinkable tubing for insulation and/or insulation and mechanical stabilization.

According to the present invention, it is possible to weld a first conductor to several second conductors, without the occurrence of undesired contact resistances, whereby the total cross section of the second conductors is larger than the cross sections that can usually be welded with the ultrasonic welding device used. Large and small cross sections may be processed without any difficulty by means of staged welding areas with optimal welding parameters.

BRIEF DESCRIPTION OF THE DRAWINGS

Further details, advantages and characteristics of the present invention are not only apparent from the claims, the features described therein, alone or in combination, but also from the exemplary embodiments apparent from the following description of the drawings.

The drawings show.

DESCRIPTION OF THE PREFERRED EMBODIMENTS

Figure 1:
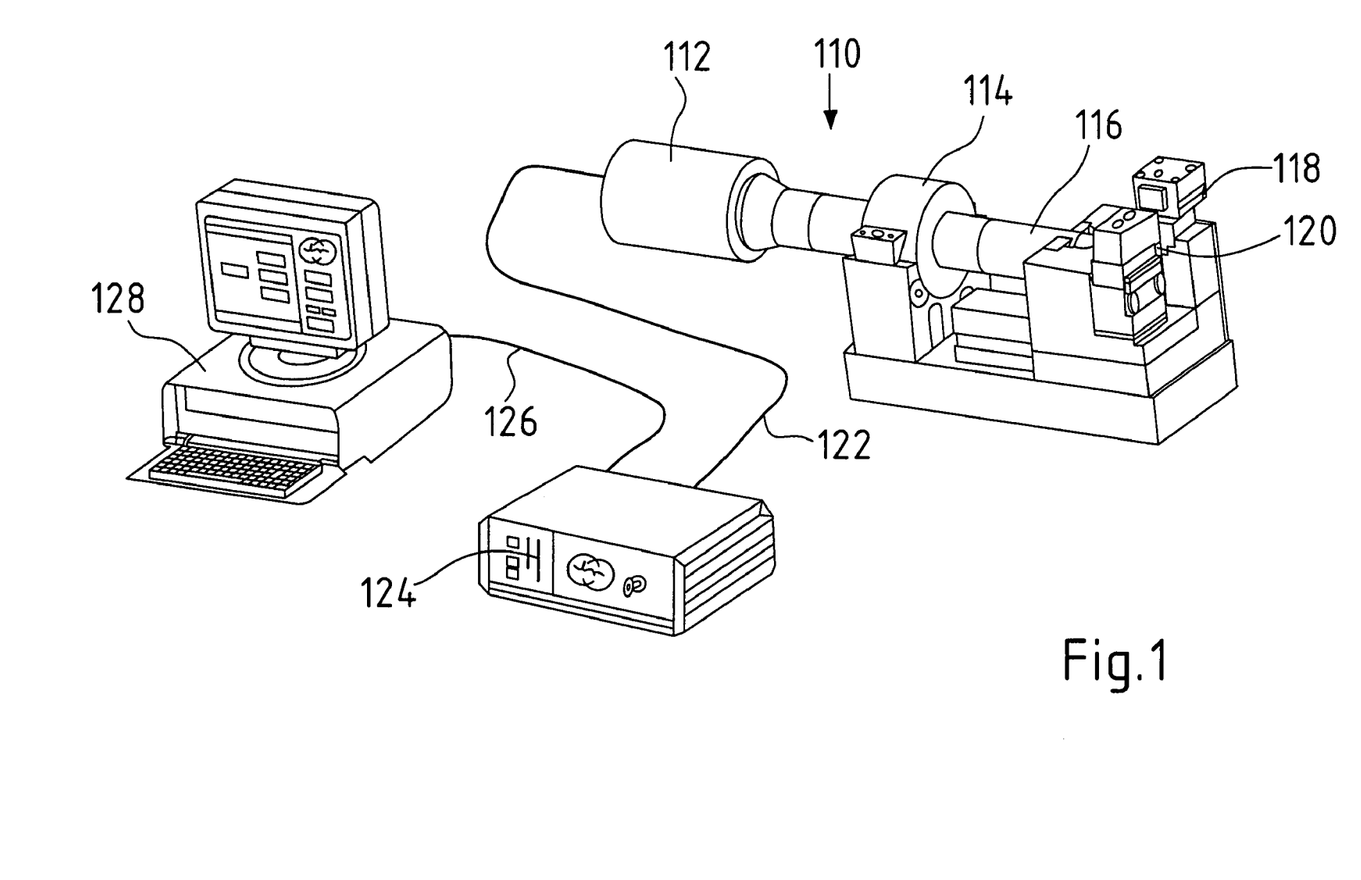
FIG. 1 a schematic diagram of an ultrasonic welding arrangement.

FIG. 1 shows a pure schematic diagram of an arrangement, with which according to the explanations below, a rigid flat support as a first conductor is ultrasonically welded to litz wires such as cables or wires as electrical second conductors. The arrangement comprises an ultrasonic welding device or machine 110, which in a conventional manner comprises a converter 112, possibly a booster 114, as well as a sonotrode 116. A multipiece counter electrode 118, also called an anvil, as well as a slide 120 are associated with the sonotrode 116 and/or a surface thereof as is apparent from DE-C-37 19 083 or WOA-A-95/10866, the disclosure of which is expressly referenced. The sonotrode 116 and/or the surface thereof, the counter electrode 118 as well as the slide 120 limit a cross-sectionally adjustable compression space, into which the first and second conductors to be welded are inserted.

The converter 112 is connected via a wire 122 to a generator 124, which in turn runs via a wire 126 to a PC 128, by means of which the welding process is controlled and the welding parameters and/or cross section and/or width of the first and second conductors are entered and/or the correspondingly stored values can be retrieved.

According to the present invention, a relevant ultrasonic welding device is used whose power rating is designed for a cross section of conductors that is smaller than the total cross sections of the second conductors to be welded onto the first conductor according to the teachings of the present invention. For this purpose, according to the present invention, several second conductors are welded to a first conductor successively. Owing to the fact that the second conductors are successively welded to the first conductor, but every second conductor as such has a maximum cross section, which in terms of power rating can be welded by the ultrasonic welding device, a total welded joint results which ensures a secure connection between the first and second conductors while minimizing the contact resistances.

Figure 2:
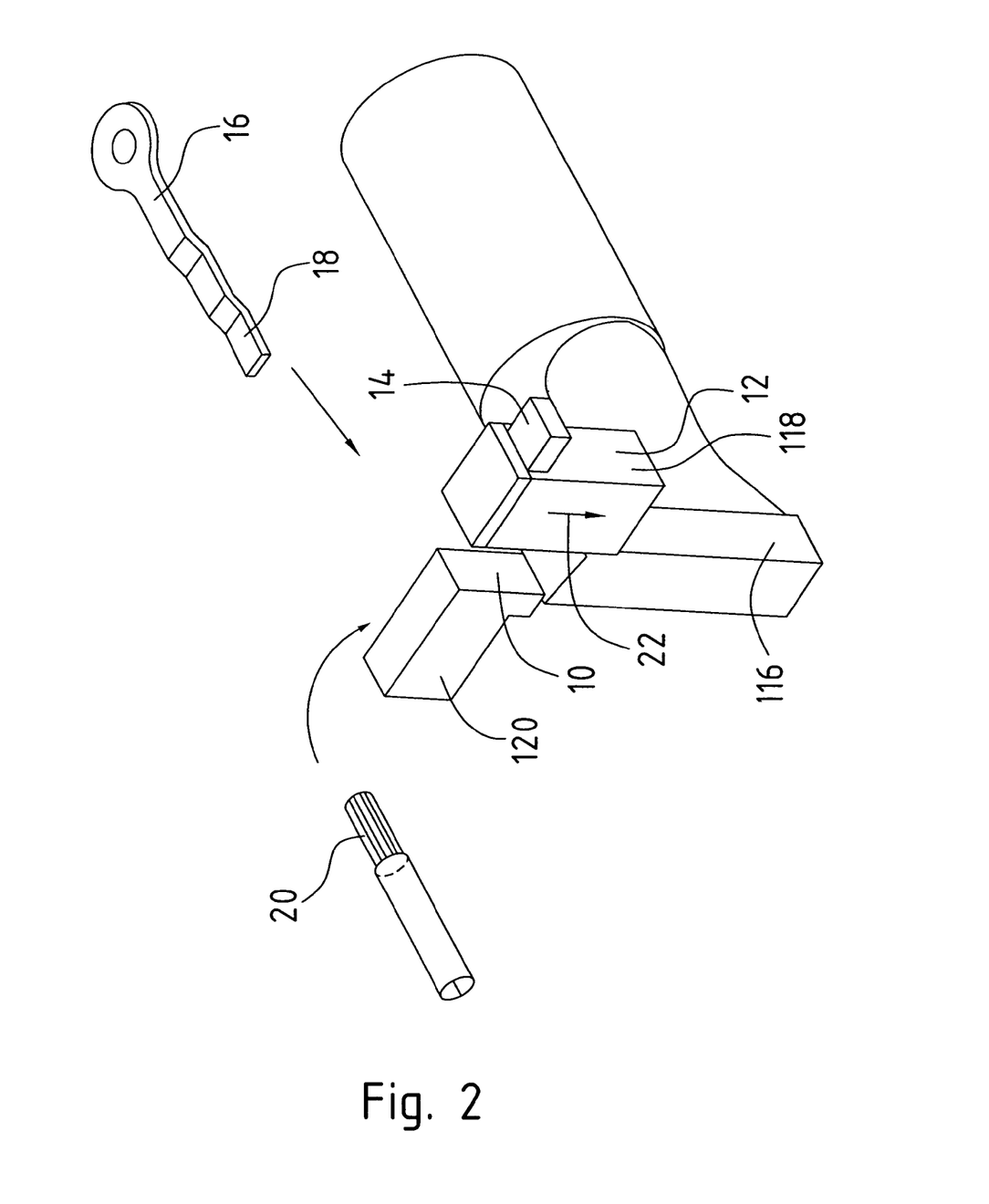
FIG. 2 a cut-out of an ultrasonic welding device with first and second conductors to be welded, FIG. 3 the first conductor welded to the second conductor, FIG. 4 a cut-out of the ultrasonic welding device according to FIG. 2 before welding of the first conductor to a further second conductor, FIG. 5 the first conductor welded to two further second conductors, FIG. 6 a perspective illustration of the first conductor shown in FIGS. 2 to 4, FIG. 7 a top view of the second conductor according to FIG. 6, FIG. 8 a side view of the second conductor according to FIGS. 6 and 7, FIG. 9 a top view of a further embodiment of a second conductor, FIG. 10 the first conductor according to FIG. 9, which is welded to two second conductors, FIG. 11 a side view of the first and second conductor according FIG. 10, FIG. 12 a further embodiment of a first conductor, FIG. 13 a side view of the first conductor according to FIG. 12, FIG. 14 a top view of the first conductor according to FIGS. 12 and 13, FIG. 15 a further embodiment of a first conductor, which is welded to two second conductors, and FIG. 16 a side view of the first conductor welded to the second conductors according to FIG. 15.

FIG. 2 shows a cut-out of the ultrasonic welding device apparent from FIG. 1, whereby the compression space 10 is surrounded by a section of the sonotrode 116, the two-piece counter electrode 118, as well as by the lateral slide 120. The two-piece anvil 118 consists of a slidable support 12 and a displaceable crosshead 14 configured parallel to the limiting surface created by the sonotrode 116.

Figure 3:
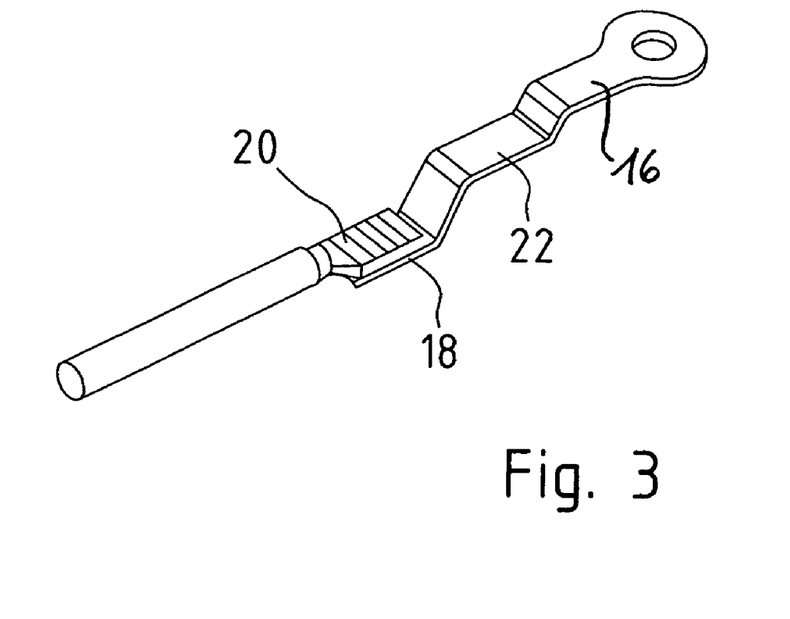
Figure 4:
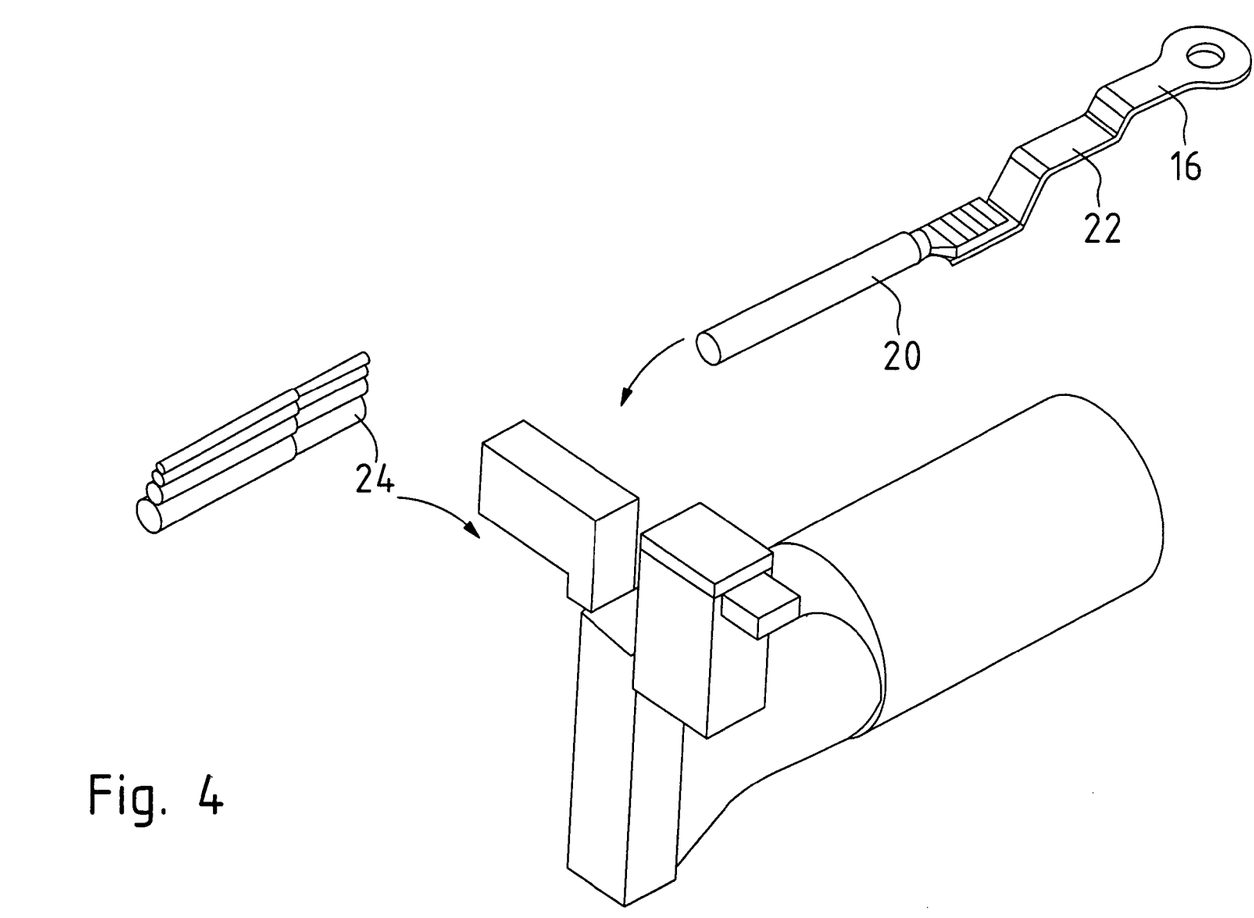
Figure 5:
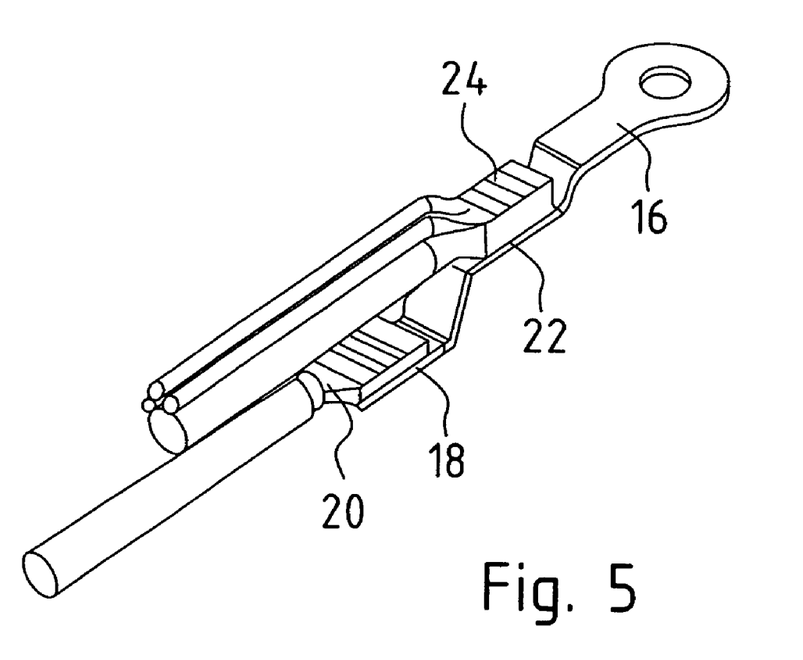

A first conductor 16 with an external section 18 is first inserted into the opened compression space 10. For the sake of simplicity, the first conductor 16 will be designated hereinafter as a support or contact piece. Subsequently, an insulated end of a litz wire 20 as a second electrical conductor is placed on the section 18 of the support 16. Then the compression space 10 is closed and the anvil 118 displaced in the direction of the sonotrode 116 (arrow 22) in order to exert the necessary pressure on the parts to be welded, i.e. the support 16 and the litz wire 20. At the same time, the sonotrode 116 produces ultrasonic vibrations in order to carry out the required welding process. After welding, the compression space 10 is opened and a connection between the support 16 and the litz wire 20 is obtained, namely in the section 18 of the support 16, as is apparent from FIG. 3. Then the support 16 is displaced relative to the compression space 10 such that the section 22 spaced apart from the section 18 by means a step is situated in the compression space 10. The section 22 runs parallel to the external section 18. After positioning of the section 22 of the support 16 inside the compression space 10, in the exemplary embodiment a group of litz wires 24 is placed on the section 22 inside the compression space as a second electrical conductor in order to perform the welding as described above. As a result, a welded part is obtained, which is apparent from FIG. 5. Thus the support 16 in each of the sections 18, 22 is welded to a second electrical conductor and/or group of second electrical conductors, namely to the litz wire 20 and the group of litz wires 24. In this process, the total cross section of the second electrical conductors may be larger than that of the electrical conductors that can usually be welded with the ultrasonic welding device.

With ultrasonic welding devices with a power rating of up to 3 kW it is possible to weld litz wires with a total cross section of 35 mm2, for example. On the basis of the teachings according to the present invention, second conductors having a larger total cross section may be welded to the first conductor. However, the prerequisite for this is that in each welding process second conductors with a maximum cross section that is less than or equal to 35 mm$^2$ are welded to the first conductor, as long as the values mentioned above are taken as a basis.

The advantage of the method according to the invention is also that second conductors of different cross sections are welded successively to the first conductor, so that optimal process monitoring is possible for each of the cross sections of the conductors to be welded.

Figure 6:
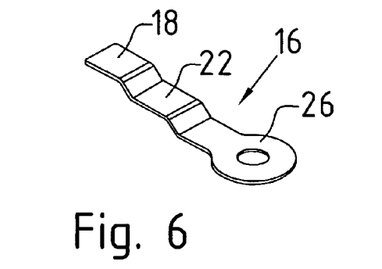
Figure 7:
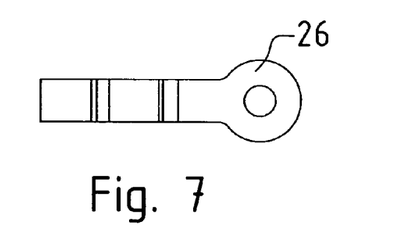
Figure 8:
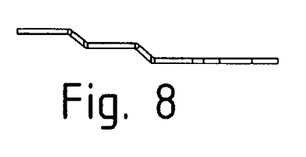

The support and/or contact piece 16 is once more shown in a perspective view in FIG. 6. One can identify the front section 26 configured as a grommet to be connected to a connector as well as the sections 18, 22 which extend in parallel planes relative to it. This is likewise apparent from the illustrations of FIGS. 7 and 8. In addition, a further second electrical conductor can be welded to the section 26 configured as a grommet.

Figure 9:
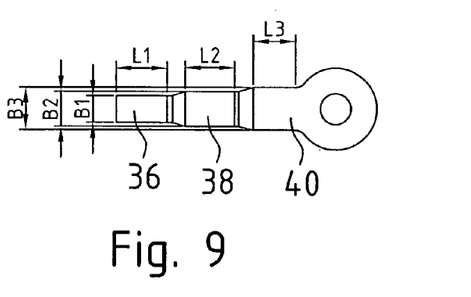
Figure 10:
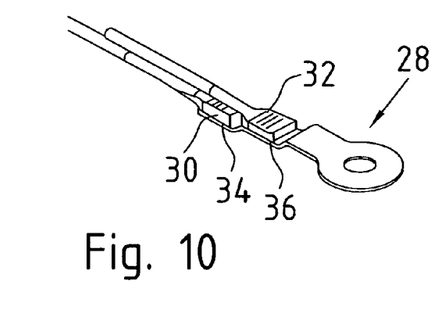
Figure 11:
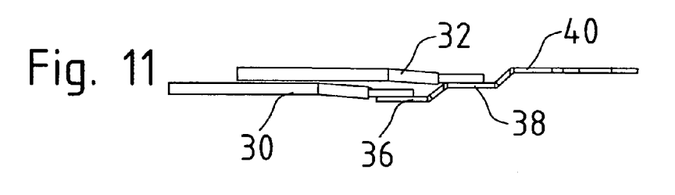

FIGS. 9 to 11 show a variant of a corresponding contact piece that is designated with the reference numeral 28. The support and/or the contact piece 28 differs from the support 16 in that the sections 34, 36 to be welded to the litz wires 30, 32 are not only spaced apart from one another by steps, but also have different widths. In the exemplary embodiment, the external section 36 is narrower than the middle section 38, which in turn is narrower than the front or grommet section 40.

Figure 12:
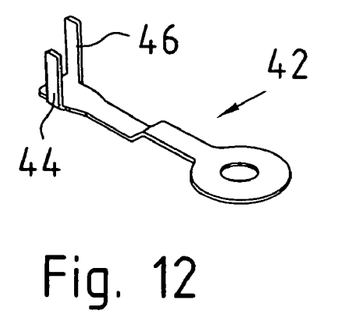
Figure 13:
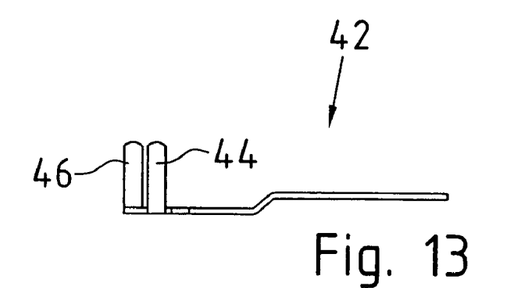
Figure 14:
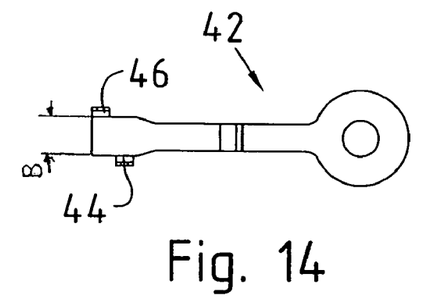

A contact piece 42 that is apparent from FIGS. 12 to 14 as a first electrical conductor has so-called supporting or crimp tags 44, 46 at the end which, after welding of the second electrical conductors to the support 42, are bent in the direction of the welded second conductors by means of ultrasound in order to provide additional mechanical attachment. Moreover, it is possible to slide a heat shrinkable tube over the welded part in order to provide insulation that offers additional mechanical stability.

Figure 15:
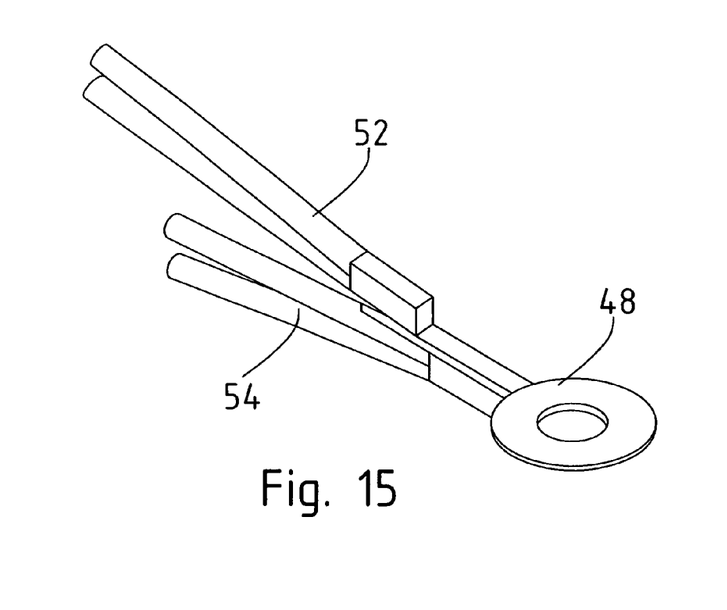
Figure 16:
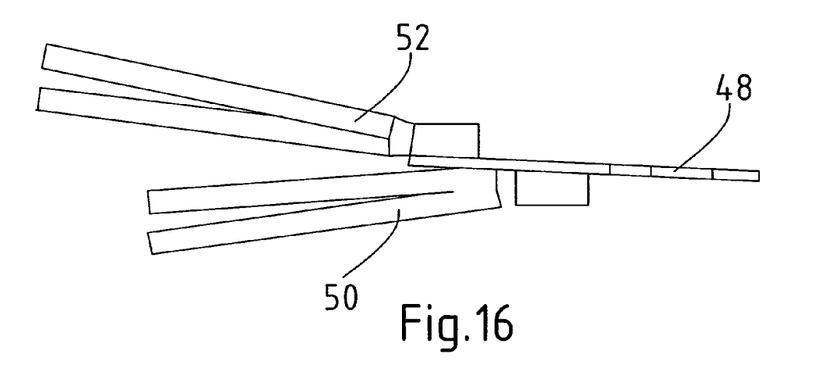

While in the exemplary embodiments explained above a first electrical conductor, such as a contact piece, support or terminal, is connected to several electrical conductors on one side only, it is also possible that second electrical conductors are welded on opposite sides of the first electrical conductor, whereby the second electrical conductors are welded successively to the first electrical conductor according to the teachings of the present invention. Thus, FIGS. 15 and 16 show that a contact piece 48 as a first electrical conductor on its opposite sides is welded each time to a second electrical conductor 50, 52, which in turn may consist of two or more litz wires welded to one another.

The invention claimed is:

1. A method for producing at least one welded joint between only one first electrical conductor which is a terminal comprising a rigid flat support portion attached to a connecting portion, and a plurality of second electrical conductors, each of said second electrical conductors being a single wire, comprising the steps of:
    inserting only one said first conductor and at least one initial second conductor into a compression space surrounded by limiting elements which are displaceable relative to each another, one of said limiting elements being a sonotrode of an ultrasonic welding device,
    closing the compression space by displacing the limiting elements to compress the only one first conductor and the at least one initial second conductor,
    welding the only one first conductor and the at least one initial second conductor by exciting the sonotrode to produce ultrasonic vibrations,
    opening the compression space with the welded first conductor and initial second conductor therein, and placing at least one additional second conductor in the compression space,
    closing the compression space to compress the at least one additional second conductor, and
    welding the at least one additional second conductor to the first conductor or to the welded initial second conductor by exciting the sonotrode to produce ultrasonic vibrations, in a successive welding process.

2. The method according to claim 1, wherein at least one of the initial second electrical conductor and additional second electrical conductor comprises litz wires.

3. A method according to claim 1, wherein during the successive welding processes, the first conductor is displaced relative to the compression space.

4. A method according to claim 1, wherein the first conductor is adjusted to the compression space.

5. A method according to claim 1, wherein the initial and additional second conductors have different cross sections.

6. A method according to claim 1, wherein the initial and additional second conductors are welded on top of one another onto the first conductor.

7. A method according to claim 1, wherein the initial and additional second conductors are welded to the first conductor in areas that are spaced apart from one another.

8. A method according to claim 1, wherein the initial and additional second conductors are welded to areas of the first conductor that run in different planes from one another.

9. A method according to claim 1, wherein the initial and additional second conductors are welded to areas of the first conductor that extend over levels that are spaced apart from one another and parallel to one another.

10. A method according to claim 1, wherein the initially welded second conductor is a grounding cable or battery cable, and the at least one additional second conductor is a control cable.

11. A method according to claim 1, wherein the initial second conductor and at least one additional second conductor are welded to said first conductor in parallel in an area that runs crosswise to a longitudinal axis of the first conductor.

12. A method according to claim 1, wherein at least one of the initial second conductor and the additional second conductor comprises a group of conductors.

13. A method according to claim 1, wherein supporting sections originate from the first conductor,
additionally comprising, during or after welding a final step of said welding, bending the supporting sections in a direction towards the second electrical conductors by ultrasonic excitation of the sonotrode, in order to secure the first conductor to the second conductors.

14. A method according to claim 1, wherein in the opening step, a single second conductor is placed in the welding space, and wherein the ultrasonic welding device has a power output which is not sufficient to weld a plurality of second conductors to the first conductor in a single welding step.

15. A method according to claim 1, additionally comprising repeating the steps of:
opening the compression space with the welded first conductor and at least one initial second conductor therein, and placing at least one additional second conductor in the compression space,
closing the compression space to compress the at least one additional second conductor, and
welding the at least one additional second conductor to the first conductor or to the welded initial second conductor by exciting the sonotrode to produce ultrasonic vibrations, in a successive welding process.

16. A method according to claim 1, wherein at least one of said second conductors is a stranded wire.

17. A method according to claim 1, wherein in the inserting step, only one initial second conductor is inserted in the compression space.

* * * * *